April 7, 1970 B. A. C. PITTMAN ET AL 3,504,717
APPARATUS FOR CUTTING A CONTINUOUSLY MOVING STRIP OF MATERIAL
Filed April 8, 1968
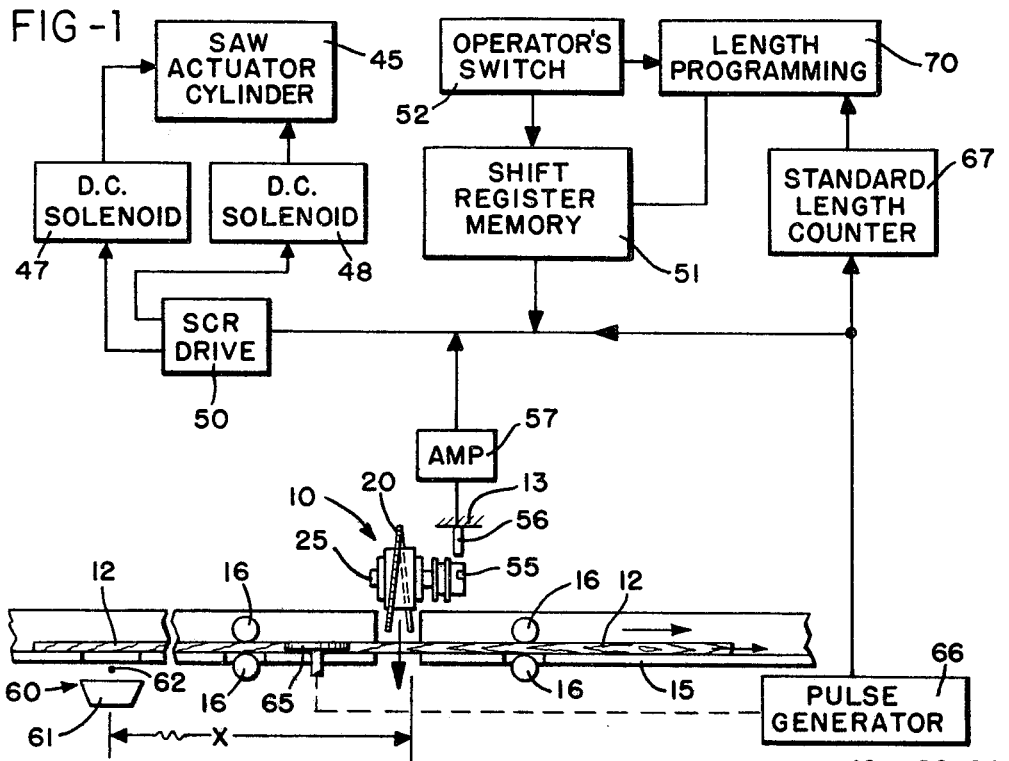
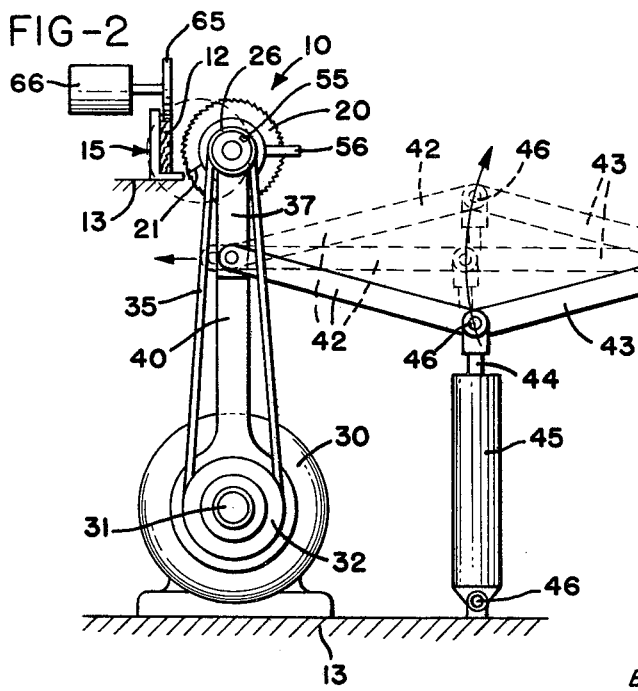
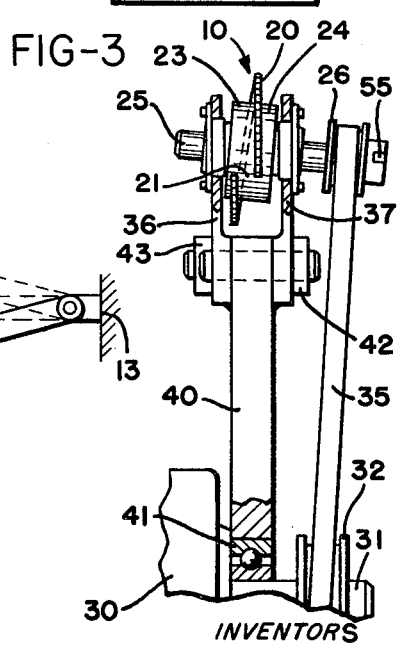
INVENTORS
BARRY A.C. PITTMAN &
CARL W. MAXEY
BY Marechal, Biebel, French & Bugg
ATTORNEYS

United States Patent Office 3,504,717
Patented Apr. 7, 1970

3,504,717
APPARATUS FOR CUTTING A CONTINUOUSLY MOVING STRIP OF MATERIAL
Barry A. C. Pittman and Carl W. Maxey, Everett, Wash., assignors to The Black Clawson Company, Hamilton, Ohio, a corporation of Ohio
Filed Apr. 8, 1968, Ser. No. 719,453
Int. Cl. B26d 5/38
U.S. Cl. 143—46                                    7 Claims

ABSTRACT OF THE DISCLOSURE

A saw for making a cut perpendicular to the direction of movement of a continuously moving strip of material is formed from a discontinuous helical blade having a cutting edge on its circumference. The speed or rotation of the blade and the pitch angle of the helix are correlated with the longitudinal speed of the strip of material so that the cutting edge of the blade does not move longitudinally relative to the material and thus is able to effect a square cut in the material. The discontinuity in the blade is prevented from engaging the material by an electronic means associated with the actuator which moves the saw into cutting relation with the material.

RELATED APPLICATION

Reference is hereby made to copending United States application Ser. No. 4,868, filed on even date herewith, entitled Apparatus for Cutting a Continuously Moving Strip of Material, and assigned to the same assignee as the present invention.

BRIEF DESCRIPTION OF THE INVENTION

This invention relates to a device for making square cuts in lumber or other strip material such as plastic, millwork and the like, in order to remove defects from the material and to cut it into a selected one of several available predetermined standard lengths while the strip of material is being moved continuously past the device without stopping the material during the cutting operation. By allowing the material to move continuously, even during the time the material is being cut, increased speeds of operation are obtained.

In the preferred embodiment of this invention, an operator may observe a defect approaching the saw, and when the defect passes an observation point a predetermined distance upstream from the saw, he momentarily actuates a switch to initiate the cutting cycle. When the defect then reaches the saw, the saw is moved into the material and the cut is made. Electronic means are also included to cut the material into standard lengths by measuring the length of the material passing the saw and providing a cutting signal after a predetermined length of material has passed since the last cut was made, independently of whether it was manually or automatically caused.

A saw having a helical blade is employed to make a square cut in the continuously moving strip of material. The helical blade may be formed from a discontinuous circular saw blade mounted to rotate about an axis with the speed of rotation and the pitch angle of the blade correlated with the speed of longiutdinal movement of the strip of material so that the cutting portion of the blade does not move longitudinally relative to the continuously moving strip of material and thereby cuts the material perpendicularly to its direction of travel.

Since the helical blade is discontinuous, the discontinuity in the blade must be kept from engaging the strip of material as this would tend to break the saw or to start a cut at a location different from the one selected by the operator or by the standard length circuit. Means are employed to cause the helical blade to move into the strip of material and return to its starting position in less than one revolution of the blade using only the continuous portion of the blade for cutting purposes.

Means are employed to sense the position of the discontinuity in the helical blade, and in the preferred embodiment of the invention a magnetic means is mounted to rotate with the blade and cause an electrical pulse to be generated in a pickup means for each revolution of the blade. This electrical pulse is synchronized with the discontinuity of the blade and is used to energize the mechanism which moves the helical blade into the strip of material.

Accordingly, the principal object of this invention is to provide a saw for cutting a continuously moving strip of material perpendicularly to its direction of movement, which incorporates a helical blade wherein the speed of rotation of the blade and the pitch angle of the helix are correlated with the longitudinal speed of the material, and to provide a helical blade wherein only the continuous cutting edge of the blade cuts the material while the discontinuity in the saw is protected by synchronizing the movement of the saw into the material with the discontinuity in the blade so that the saw is moved into and through the material and is returned to a location clear of the material within one revolution of the blade.

BRIEF DESCRIPTION OF THE DRAWINGS

FIG. 1 is a plan view of a helical saw mounted for relative movement into a continuously moving strip of material with the electronic circuitry used to control the saw shown in block diagram form;

FIG. 2 is a front elevational view of a helical saw, drive motor, and the actuator used to move the helical saw into cutting engagement with a continuously moving strip of material; and FIG. 3 is a side view of the helical saw shown in FIGS. 1 and 2 showing the support and drive mechanism partly in cross section.

DESCRIPTION OF THE PREFERRED EMBODIMENT

The helical saw shown generally at 10 is mounted to cut the strip of material 12, such as lumber, plastic, millwork and the like, into separate pieces while the material is continuously moving longitudinally relative to the saw, from left to right in FIG. 1, and with each cut made perpendicularly to the direction in which the material is moving. The material 12 is supported on the base 13 by a conveyor 15 and is prevented from moving laterally by four rollers 16. The details of the conveyor mechanism are not shown because they are of conventional design and form no part of the present invention.

The helical saw 10 may be formed from a conventional circular saw blade 20 by cutting the blade at 21 from the outer circumferential edge to the center hole, and then mounting the blade between a pair of hub plates 23 and 24 to form the blade 20 in a helical configuration. Other means may be used to form the helical blade, keeping in mind that the pitch angle of the helix is correlated with the speed of rotation of the blade and the longitudinal speed of the material 12.

The helical blade 20 is mounted on a shaft 25 which has attached thereto a pulley 26 driven by an electric motor 30 or other suitable driving means mounted on the base 13 and having an output shaft 31 on which is attached another pulley 32, and a belt 35 forms a driving connection between pulleys 32 and 35. The shaft 25 is journalled in a bearing assembly including a pair of plates 36 and 37 extending upwardly from an arm 40, pivotally supported on the motor shaft 31 by a bearing 41 to permit the saw to be driven continuously as it moves from its initial or starting position as shown in FIG. 2 into and through the material 12. The shaft 25 is inclined in a plane parallel to the material 12 at an angle equal to the pitch angle of the helical blade so that a cut perpendicular to the direction of travel of the material will be made as the blade is moved into cutting relationship to the strip of material.

The arm 40 is pivoted about the motor shaft 31 by a toggle linkage comprising two links 42 and 43. As shown in FIG. 2, the left end of the link 42 is pivotally attached to the arm 40, and the right end of the link 43 is pivotally mounted to the base 13. The other ends of both links 42 and 43 are pivoted together and to the piston rod 44 of a double acting fluid pressure cylinder 45 having a fixed pivotal mounting 46. The full stroke of piston rod 44 from the position shown in solid lines in FIG. 2 forces the saw 10 into and through the material 12, and then returns the saw to a starting position in less than one complete revolution of the blade. Activating the cylinder 45 to drive the piston in the opposite direction causes an identical motion of the saw.

The speed of rotation of the saw 10 is correlated with the pitch angle of the helical blade and the longitudinal speed of the strip of material 12. For a 100-foot per minute longitudinal speed of the strip of material 12 and a blade having a 20-inch diameter and a lead of one inch, a 1200 r.p.m. saw speed will match the rate of advancement of the material so that the cutting edge of the blade has substantially no movement longitudinally of the material being cut. The tangential velocity or speed of the outer circumference of the saw in the preferred embodiment is limited to a speed in the order of from 6000 to 10,000 feet per minute, regardless of the diameter of the saw being used.

The cylinder 45 may be provided with manually operated valve controls but is shown as controlled by a pair of DC solenoids 47 and 48. FIG. 1 also shows control circuitry for solenoids 47–48 comprising a SCR (silicon controlled rectifier) drive circuit 50 and a shift register memory 51 incorporating an appropriate delay mechanism and having an operator's actuating switch 52. This arrangement permits the operator to actuate the switch 52 to produce a cutting command signal to start the cutting operation when he observes a defect opposite a predetermined reference point upstream from the saw, and which may be adjusted to compensate for the operator's reaction time as well as the time between passage of the defect past the reference point and the time when the operator actually operates the switch 52.

In order to prevent the saw 10 from advancing into the work during an interval when the discontinuity 21 in the blade would engage the material, the circuitry in FIG. 1 also incorporates means for sensing the angular position of the discontinuity 21 and controlling the starting signal accordingly. FIG. 1 shows such a sensing means as a wand of ferrous material 55 mounted to rotate with the blade 20, and a magnetic pickup 56 mounted on the base 13 and electrically connected to amplifier 57. The pickup 56 comprises a magnet surrounded by a coil so that each time the wand of ferrous material 55 passes the pickup 56, an electrical signal is generated. The wand of ferrous material 55 is mounted to rotate with the blade 20 in such relation with the discontinuity 21 that it passes the magnetic pickup 56 just as the discontinuity 21 begins to move away from its position nearest to the workpiece 12. Each time this occurs, the flux lines passing through the coil in the pickup 56 are disturbed and the aforementioned electrical signal is generated which identifies the position of the discontinuity 21.

The electrical signal or pulse generated in the pickup 56 is amplified in amplifier 57 and applied as one input to the SCR drive 50. Thus for each revolution of the blade 20, a synchronizing pulse is generated which represents the position of the discontinuity in the saw, and it is only when an enabling signal from the shift register memory 51 coincides with this synchronizing pulse that the SCR drive 50 is activated to energize the appropriate solenoid 47 or 48 to operate the cylinder 45 and thereby to drive the saw through a complete cycle of operation making the desired cut in the material 12.

If the saw 10 is to be used for cutting out defective portions of the material 12, it is advantageous for the operator to locate each such defect by reference to a shadow line device 60 comprising a source of light 61 and a wire 62 extending transversely of the length of the material 12 between the light source 61 and the material. The wire 62 will accordingly cast a precisely defined shadow on the material at a predetermined distance upstream from the saw 10, and when a defect passes this shadow line, the operator may actuate the switch 52 to initiate the cutting cycle as described. The delay mechanism in the memory 51 is adjusted in accordance with the speed of the material to cause the cutting stroke when the desired location in the material has moved into cutting position.

Improved accuracy is obtained if the movement of the material 12 with relation to the saw is monitored by a length sensor, shown as comprising a measuring wheel 65 engaging the edge of the material 12 and driving a pulse generating device 66, which form a length sensing means providing electrical pulses representing small but equal lengths of material passing under the measuring wheel 65. These length pulses are applied as input signals to the shift register memory 50 and to a standard length counter circuit 67, in order to correlate the enabling signal from the memory 51 to the drive 50 with the travel of the material from the shadow line device to the cutting position.

The saw 10 may also be provided with controls causing it to cut the material 12 automatically into predetermined standard lengths. For this purpose, a length programming circuit 70 selects one of a number of predetermined standard length signals supplied by the standard length counter 67 and applies that signal to the shift memory 51. A reset signal is applied to the counter 67 each time a cut is made, whether by the operator or through the operation of the counter. Reference is made to copending application Ser. No. 552,940, filed May 25, 1966, and assigned to the same assignee, for a description of a shadow line device and electronic circuitry which provides for the delay between the manual actuation of the switch by the operator and the application of a cutting signal to the saw, and which may be employed to provide cutting signals at predetermined standard lengths in practicing the present invention.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. Apparatus for cutting a longitudinally moving strip of material perpendicularly to its direction of movement without stopping the material during the cutting operation, comprising a stationary base supporting the material for movement, a saw including a discontinuous helical blade extending substantially completely around an axis and having a cutting portion on its outer circumferential edge, means for rotating said blade about said axis with the speed of rotation and the pitch angle of said blade correlated with the speed of longitudinal movement of said strip of material so that said cutting portion has substantially no movement longitudinally relative to the strip of material, means supporting said saw or said base for movement substantially normally of said direction of movement, actuating means for moving said blade into and through the material and returning it to a position clear of the material in less than one revolution of the blade, and means sensing the angular position of the discontinuity in said blade and controlling said actuating means to move said blade into the strip of material only when a continuous cutting edge of said blade is presented to the material.

2. The apparatus of claim 1 wherein said axis is inclined with respect to the strip of material to present the cutting edge of said blade substantially normally to the strip and said direction.

3. The apparatus of claim 1 wherein said sensing means includes ferrous material mounted to rotate with said blade, magnetic pickup means sensing the passage of said ferrous material during each revolution of the blade to produce an electrical signal, and circuit means responsive to said electrical signal for supplying power to said actuating means to move said helical blade into and through the material and to return it to a position clear of the material in less than one revolution of said blade during that period of revolution of said blade when a continuous cutting edge of said blade will engage the material.

4. The apparatus of claim 1 further comprising:
length sensing means associated with the moving strip of material for producing output signals for specified lengths of travel of the strip of material; and
means responsive to said output signals from said length sensing means for producing a cutting command signal after the strip of material has moved a predetermined distance since the last cutting command signal to cut the strip of material into predetermined standard lengths.

5. The apparatus of claim 1 further comprising:
means located a predetermined distance from said saw in a direction opposite to the direction of movement of the strip of material to provide a shadow line reference location including a source of light illuminating the moving strip of material and means between said source of light and the strip of material for producing a shadow line extending transversely across the strip of material; and
manually operated switch means which may be actuated as that part of the moving strip of material which is to be cut passes under said shadow line to produce a cutting command signal to be applied to said actuating means.

6. The apparatus of claim 5 further comprising:
length sensing means associated with the moving strip of material for producing output signals for specified lengths of travel of the strip of material; and
delay means connected to said length sensing means and to said manually operated switch means for delaying the application of said cutting command signal to said actuating means until a predetermined number of said output signals has been produced indicating that the strip of material has moved the predetermined distance from said shadow line to said saw.

7. The apparatus of claim 5 further comprising:
length sensing means associated with the moving strip of material for producing output signals for specified lengths of travel of the strip of material;
means responsive to said output signals from said length sensing means for producing other cutting command signals after the strip of material has moved a predetermined distance since the last cutting command signal to cut the material into predetermined standard lengths; and
delay means connected to receive said cutting command signals for delaying the application of said cutting command signals to said actuating means until the strip of material has moved the predetermined distance from said shadow line to said saw.

References Cited

UNITED STATES PATENTS

| | | | |
|---|---|---|---|
| 2,277,942 | 3/1942 | Anderson | 83—340 X |
| 2,717,639 | 9/1955 | James | 83—872 X |
| 2,767,459 | 10/1956 | Holman et al. | 143—47 X |
| 3,286,569 | 11/1966 | Hancock et al. | 83—340 X |

DONALD R. SCHRAN, Primary Examiner

U.S. Cl. X.R.

83—340, 672; 143—47